Figure 1:
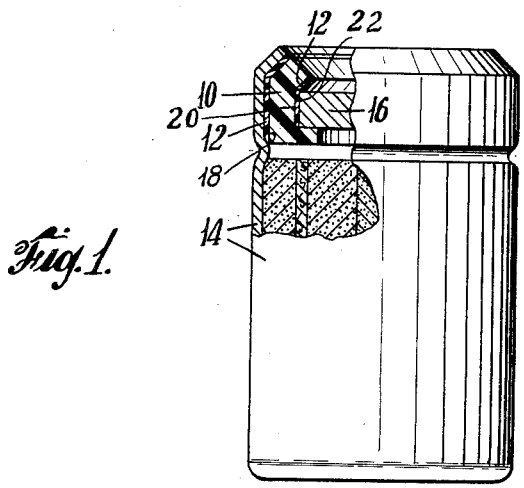

Dec. 11, 1962  J. L. S. DALEY  3,068,313
HIGH PRESSURE MECHANICAL SEAL GASKET
Filed Nov. 19, 1958

INVENTOR.
JOHN L. S. DALEY
BY John F. Hohmann
ATTORNEY

United States Patent Office 3,068,313
Patented Dec. 11, 1962

3,068,313
HIGH PRESSURE MECHANICAL SEAL GASKET
John L. S. Daley, Bay Village, Ohio, assignor to Union Carbide Corporation, a corporation of New York
Filed Nov. 19, 1958, Ser. No. 774,930
9 Claims. (Cl. 136—133)

This invention relates to an improved seal gasket for radially sealing a galvanic cell and especially a galvanic cell having an alkaline electrolyte.

For many years there have been so-called "leak proof" type cells available, but none of these cells have actually retained electrolyte successfully for long periods of time. Escape of electrolyte to the outside of the cell container is particularly a problem in the case of a cell containing a caustic electrolyte, which is about the most difficult to seal, for not only is the supply of electrolyte within the cell diminished, but a hazard is created if the cell is to be handled.

Copending application, Serial No. 774,931, filed November 19, 1958 by R. Carmichael et al., discloses an excellent method for sealing alkaline galvanic cells.

As disclosed therein, the seal closure used in effectuating the leak-proof sealing of a galvanic cell having a rigid metal sidewall comprises a cover made of a rigid metal and an annular gasket of hard, di-electric plastic-like material. The cover has a substantial horizontally disposed portion which terminates at the periphery of the cover in a vertical edge. The annular gasket of hard plastic is characterized by a resistance to cold-flow and a high compressive and shear strength. Further, the gasket is provided with an inner vertical section which corresponds to the vertical edge of the cover and an outer vertical section which corresponds to a section of the sidewall of the cylindrical container.

The gasket is interposed between the cover and the inner sidewall of the container with the coresponding vertical portions of the three members being in juxtaposition. The actual sealing of the cell is effected by radially compressing the gasket between the container sidewall and the cover under a high radial force which is normal to the vertical portions of the container sidewall, cover, and gasket, and parallel to the substantial horizontally disposed portion of the cover. After the compressive force is removed from the container, the gasket will exert a similar radial compressive force outwardly against the container which is substantially equivalent to, but not greater than the yield strength of the metal of which the sidewall of the container is made.

The term "cold-flow," as used herein and in the appended claims, refers to the gradual deformation of a material that occurs when that material is subjected to a constant load at room temperature. Materials which deform very little or only when large forces are applied and which do not continue to deform or creep when the force is applied for a considerable length of time are said to have good cold-flow characteristics. The cold-flow is in a direction generally perpendicular to the applied load.

The complete success of the above method for preventing electrolyte leakage, may however also be dependent upon the smoothness of the contacted metal surfaces, particularly the smoothness of the cell container. The usual, low cost drawn or extruded metal container that is used may be scored or scratched to some extent during manufacture. If a hard enough gasket is used to resist cutting and deformation under a high radial compression, the ordinary metal container is usually not sufficiently strong to hold in the gasket the degree of compression required to fill the imperfections in the can, and thus electrolyte leakage paths exist.

Accordingly, the principal object of the invention is to provide a seal gasket which is sufficiently hard to be radially compressed under a high radial force which will prevent electrolyte leakage between the cell container and cover without cutting through, but which is also soft enough to deform and fill the imperfections in the cell container.

Broadly stated, the object of the invention is accomplished by the use of a compound gasket comprising a basically hard class of plastic, such as nylon, coated on the sealing surfaces with a very thin layer of a softer material, which is not deleteriously affected by electrolyte and which will distort and fill the imperfections in the metal surfaces.

Figure 2:
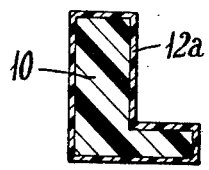
Figure 3:
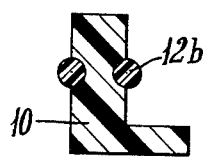
Figure 4:
Figure 5:
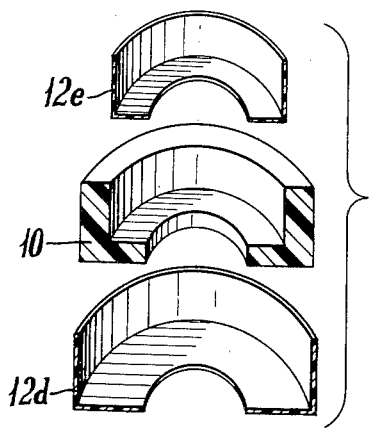

The invention will be more readily understood by reference to the accompanying drawings, wherein:

FIG. 1 is a partially sectioned elevation of a radially sealed galvanic cell having a seal gasket which embodies the principles of the invention; and FIGS. 2–4 are elevational views of other embodiments of the seal gasket of the invention; and FIG. 5 is an exploded elevational view of still another embodiment of the seal gasket of the invention.

Referring now to the drawings, wherein like reference figures refer to similar parts throughout the various views, the improved, high pressure, compound seal gasket of the invention comprises a generally L shaped, di-electric gasket 10 of nylon or other plastic which is resistant to cold-flow, having on at least part of its surface, a thin coating or covering 12 of a softer material. As shown in FIG. 1, the thin coating 12 may be present on the vertical sealing surfaces 18 and 20 of the gasket 10 which correspond and are in juxtaposition with respectively a vertical portion of the cylindrical container 14 and a vertical edge 22 which is the termination of a substantial horizontally disposed portion of the cover 16. The thin coating 12a may also be present on the entire surface of the gasket 10 as shown in FIG. 2, in which case the thin coating 12a must also be of a di-electric material or, as shown in FIG. 5, the compound gasket of the invention may comprise a hard plastic cup 10, generally of an L shaped cross-section, which snugly rests in an outer cup 12d of a softer material and in turn has nesting in it, an inner cup 12e also of a softer material. The softer layer 12b of the compound gasket may also be present on the sealing surfaces of the hard gasket 10 as O rings as shown in FIG. 3. The compound gasket of the invention will also aid in successfully preventing electrolyte leakage from an alkaline galvanic cell if the softer material 12c is present on only one of the sealing surfaces of the gasket as shown in FIG. 4, and this is particularly true if it is present on the negatively charged sealing surface.

In the alternative, the layer of softer material may be initially provided on the contacting surfaces of the metal container 14 and metal cover 16 instead of on the contacting surfaces of the hard gasket 10.

The softer material need only be present in a thick enough layer so that it may be squeezed into the crevices and imperfections in the metal parts and be there confined by the harder plastic. The radial force applied to the gasket can be as high as the hard plastic and metal parts will tolerate and the force exerted by the caustic electrolyte in attempting to escape from the cell will not be sufficient to move the softer material under such loading because the softer material constitutes such a thin layer.

A layer of asphalt 0.0003 to 0.003 inch thick on a nylon backing is a suitable compound gasket. Likewise, a layer of a vinyl or polyethylene may be sprayed or dipped on, or applied as separate parts to the nylon as a cup or extruded tube in a thickness approximately that of the asphalt.

What is claimed is:

1. A sealed galvanic cell comprising a cupped metallic container made of a rigid metal and having an electrolyte therein; said cell being sealed at the open end of said cupped container by a seal closure which comprises a cover made of a rigid metal, an annular gasket of a hard di-electric plastic-like material and a layer of a softer material which is not deleteriously affected by said electrolyte; said cover having a substantial horizontally disposed portion which terminates at the periphery of said cover in a vertical edge; said annular gasket of a hard plastic-like material being characterized by a resistance to cold-flow and a high compressive and shear strength and having an inner vertical section which corresponds to said vertical edge of said cover and an outer vertical section which corresponds to a section of said cupped cylindrical container; said gasket being interposed between said cover and the inner sidewall of said cupped container with its vertical portions in juxtaposition with the corresponding vertical portions of said container sidewall and said cover; said layer of a softer material being interposed between at least part of said vertical portions of said gasket, said container sidewall and said cover which are contacting surfaces; said gasket and said softer material being in a state of radial compression between said cover and said container sidewall and exerting a force which is normal to said vertical portions of said container sidewall, cover, and gasket, and parallel to said substantial horizontally disposed portion of said cover; said force being substantially equivalent to, but not greater than the yield strength of the rigid metal of which said cupped container is formed.

2. The sealed galvanic cell of claim 1 wherein said annular gasket is made of a hard nylon plastic and said softer material is chosen from the group consisting of asphalt, vinyls and polyethylene.

3. A compound seal gasket for use in radially sealing a galvanic cell against electrolyte leakage; said galvanic cell comprising a cupped metallic container made of a rigid metal, a cover made of a rigid metal and having a substantial horizontally disposed portion which terminates at the periphery of said cover in a vertical edge, and having an electrolyte therein; said compound seal gasket comprising an annular gasket of a hard di-electric plastic having at least a partial thin covering of softer material which is not deleteriously affected by electrolyte; said annular gasket of a hard plastic being characterized by a resistance to cold-flow and a high compressive and shear strength and having an inner vertical section which corresponds to said vertical edge of said cover and an outer vertical section which corresponds to a section of said cupped cylindrical container when said compound gasket is interposed between said cover and the inner sidewall of said cupped container; said covering of a softer material being disposed on at least a part of said vertical portions of said compound gasket which will be contacting surfaces with said corresponding vertical portions of said container and cover.

4. The compound seal gasket of claim 3 wherein said annular gasket is of a hard nylon plastic and said softer material is chosen from the group consisting of asphalt, vinyls, and polyethylene.

5. The compound seal gasket of claim 4 where said covering is 0.0003 to .003 inch thick.

6. The compound seal gasket of claim 4 where said soft covering is of a di-electric material which completely encloses said hard nylon gasket.

7. The compound seal gasket of claim 4 where said covering, completely covers the sealing surfaces between said hard nylon gasket and said metal cover and said metal container.

8. The compound seal gasket of claim 4 where said covering is an O ring in said hard nylon plastic gasket at the sealing surfaces between said hard nylon plastic gasket and said metal cover and said metal container.

9. The compound seal gasket of claim 4 where said covering is present on the negatively charged sealing surfaces between said gasket and said metal cover and said metal container.

References Cited in the file of this patent

UNITED STATES PATENTS

| 2,495,247 | Friedman | Jan. 24, 1950 |
| 2,606,941 | Ruben | Aug. 12, 1952 |
| 2,611,793 | Simpson | Sept. 23, 1952 |
| 2,636,062 | Colton | Apr. 21, 1953 |
| 2,665,329 | Brennan | Jan. 5, 1954 |
| 2,712,565 | Williams | July 5, 1955 |
| 2,717,024 | Jelinek | Sept. 6, 1955 |
| 2,717,792 | Pelley | Sept. 13, 1955 |
| 2,843,650 | Jacquier | July 15, 1958 |

OTHER REFERENCES

"A Dictionary of Metallography" (Rolfe), published by Chapman and Hall (London), 1949, pages 80 and 285 are relied on.

"Principles of High-Polymer Theory and Practice," (Schmidt et al.), published by McGraw-Hill (N.Y.), 1948, pages 270 and 513 are relied on.